March 6, 1928.                                                                    1,661,447
W. P. SENG
STEERING WHEEL AND IGNITION LOCK
Filed Oct. 24, 1921

INVENTOR.
Wendelin P. Seng
BY Kent W. Wournell
ATTORNEY.

Patented Mar. 6, 1928.

1,661,447

UNITED STATES PATENT OFFICE.

WENDELIN P. SENG, OF WILMETTE, ILLINOIS.

STEERING WHEEL AND IGNITION LOCK.

Application filed October 24, 1921. Serial No. 509,950.

This invention relates to a combined lock for the steering wheel and ignition system of an automobile, although of course, it may have a more general application whenever used. The principal object of the invention is to insure that the ordinary breaking of the ignition circuit will necessitate the disengagement of the steering wheel from the steering post. A further object of the invention is to provide ignition locking means in connection with a locked steering wheel which will insure that the wheel must be connected to the steering post in an authorized manner before the ordinary ignition circuit connections can be made. Other objects will appear hereinafter.

Figure 1:
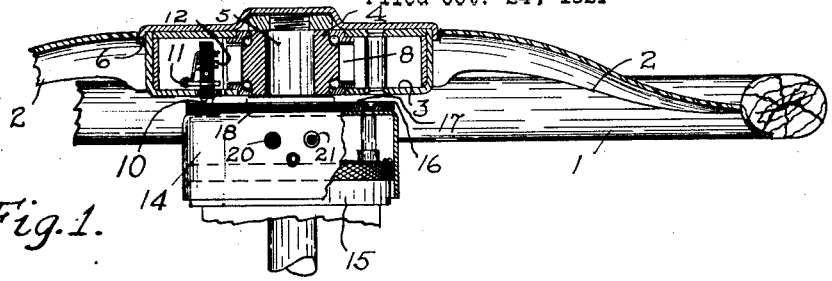
Figure 2:
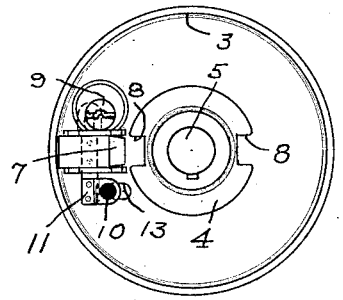
Figure 3:
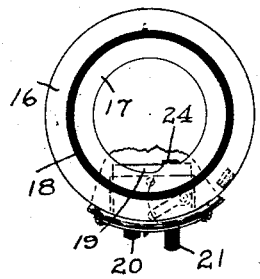
Figure 4:
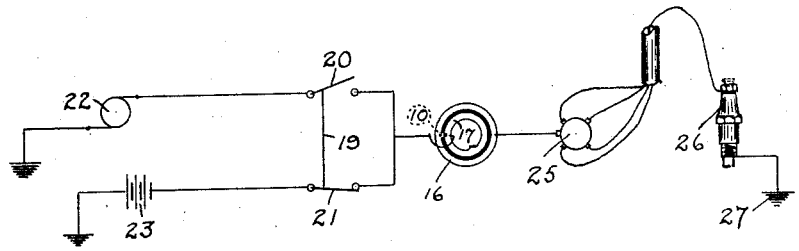

In the accompanying drawings, Fig. 1 is a view partly in section of a steering wheel and ignition lock control constructed in accordance with the principles of this invention; Fig. 2 is a plan view of the lock; Fig. 3 is a plan view illustrating the contact rings; and Fig. 4 is a diagrammatic view of the circuits controlled.

Many automobiles are stolen, not because they have no locking devices, but because the owner has failed to use the theft preventing means which he has. The present invention is particularly designed and intended to insure that whenever a driver stops his car in the ordinary manner, that action of itself will cause him to lock the steering wheel so that it cannot be used in guiding the car. The locking of the ignition circuit alone is not sufficient, as almost any clever thief can substitute circuit connections by simply lifting the hood of an automobile which will enable him to operate the car even though the ignition switch, usually on the dash board, is locked. Thus in effect the locking of the steering wheel in the present invention is dependent upon the starting of the car, and the same lock which controls the ignition circuit also controls the locking of the steering wheel.

A steering wheel having a rim 1 and radiating spokes 2 is provided at its center with a cup member 3 in which is a hub member 4 secured to a post 5 and upon which the wheel turns freely. Extending over the top of the cup member 3 and over the end of the shaft 5 is a cap 6 secured to the cup and forming a receptacle for a locking bolt 7 secured in the receptacle and adapted to co-operate with locking notches 8 of the hub member 4, the locking bolt being controlled by a key operated lock 9 accessible through the cover 6. The turning of a key in the lock operates the bolt into and out of engagement with the notches 8 of the hub member, thus connecting the steering wheel to, or disconnecting it from the hub member. When it is disconnected from the hub member the steering wheel will rotate freely upon the hub member, but it cannot be removed therefrom without removing the cap 6.

Attached to and movable with the locking bolt is an insulated contact member 10 supported by brackets 11 at one side of the locking bolt and having a spring 12 between the brackets which tends to press the contact member downwardly through an opening 13 in the bottom of the cup 3.

Directly below the steering wheel is a casing 14 which is supported in a stationary position from the steering column which surrounds the steering post, or it may be supported from a housing 15 sometimes provided at the upper end of the steering column. On top of the casing are contact rings 16 and 17 spaced from each other and from the top of the casing by insulation 18 and formed at their adjacent edges with a groove adapted to be engaged by the projecting tip of the contact member 10, so that when the locking bolt 7 is moved inwardly to engage either one of the notches 8, the contact member 10 will be disposed in the groove and will electrically connect the two contact rings 16 and 17. When the locking bolt is withdrawn, the contact member 10 is moved outwardly engaging only the outermost ring.

Within the casing 14 is an ignition switch 19 of the snap switch variety having push buttons 20 and 21, as represented diagrammatically in Fig. 4 to close a circuit either from a magneto 22 or from a battery 23, there being no open or intermediate position of the switch. One side of the battery or of the magneto is grounded and the switch has a common connection with one of the rings 17 through an ear 24, the other contact ring 16 being connected to a distributor 25 and thence through any one of the spark plugs 26 to the engine ground 27.

It will be seen that a circuit cannot be completed through the contact rings 16 and 17 either from the magneto 22 or from the battery 23 unless the contact member 10 is moved by the locking bolt into common engagement with the contact rings. The operation of the snap switch will only change the connection from the magneto to battery or vice versa, and to open the circuit to the distributor the locking bolt 7 which carries the contact member 10 must be moved out of engagement with the hub member 4. This insures that in order to stop the engine in the ordinary manner, the steering wheel must be locked out of engagement with the steering post. This will prevent an unauthorized person from guiding the car even though he is able to complete the necessary electrical circuit in an unauthorized manner.

I claim:

1. The combination with a steering shaft, of a relatively rotatable steering wheel therefor and an ignition circuit with a transversely movable contact, and a common means carried by the steering wheel for controlling the relative movement of the wheel and shaft and the movement of the contact of the said circuit.

2. The combination with a lockable steering wheel and a shaft upon which it is relatively rotatable, of an ignition circuit having a laterally movable contact closing means carried by the wheel, and a common means carried by the wheel for controlling both the locking of the wheel to the shaft and the movable means of the ignition circuit.

3. The combination with an independently rotatable steering wheel, of an ignition circuit having a portion carried by the wheel, and a common locking means carried by the wheel for controlling both the wheel and the circuit, the ignition circuit including a fixed circular contact and a slidable and transversely movable contact member therefor carried by the wheel.

4. In combination, a freely rotatable steering wheel and an ignition circuit, the ignition circuit comprising a continuous circular contact member and a transversely movable slidable contact therefor, one of which is carried by the wheel, and means for locking the wheel and moving the contact of the circuit simultaneously.

5. A rotatable steering wheel in combination with an ignition circuit, the ignition circuit comprising continuous circular contact members and a movable sliding contact adapted to engage them, one of the said circuit parts being carried by the wheel, and means for locking the wheel and moving the contact to control the circuit at the same time.

6. The combination with a rotatable steering wheel adapted to be locked in connection with a shaft, of a lockable ignition circuit comprising adjacent ring contacts and a slidable member also transversely movable for engaging them simultaneously, one of the said circuit parts being carried by the wheel, and means positively controlling the locking of the circuit part carried by the wheel and controlling the wheel itself at the same time.

7. The combination with a steering post, of a freely rotatable wheel therefor, an ignition circuit having continuous ring contact members adjacent the wheel and a movable member carried by the wheel for engaging them at the same time, and a common locking means for controlling the operation of the wheel and for operating the movable member for closing circuit connections between the ring contact members.

8. The combination with an automobile steering wheel, of an electrical circuit having a ring contact member arranged adjacent the wheel and a transversely movable and sliding contact member carried by the wheel for engaging the ring contact, and means carried by the wheel for controlling circuit connections between the ring and sliding contact members by relative sliding movement thereof.

9. The combination with a steering post, of a steering wheel adapted to be freely rotated thereon, an electrical circuit including fixed circular ring contacts and a transversely movable sliding contact carried by the wheel, means for locking the wheel to the post and means in connection with the wheel locking means for simultaneously controlling the electrical circuit by moving the sliding contact transversely into and out of engagement with the ring contacts.

10. The combination with a steering post and a lockable steering wheel freely rotatable thereon, of means for locking the wheel to the post, an electrical circuit comprising contact rings disposed adjacent the steering wheel, and means carried by the wheel in connection with the locking means and including a transversely movable contact member to engage the rings for controlling the circuit connection between the rings at the same time the steering wheel is engaged or disengaged from the post.

11. A steering wheel and a post on which it is rotatable, movable locking means for connecting the wheel to the post, a controlling circuit including a pair of insulated and spaced ring conductors carried by the post, and means in connection with the locking member and carried by the wheel to make a continuous sliding connection between the conductors depending upon the position of the locking member.

12. Automobile controlling means comprising a steering post and a lockable wheel, an ignition circuit having ring contact members fixed in position adjacent the wheel and a key operated lock in connection with the wheel having a movable conductor for making connection between the contact members only when the wheel is locked in connection with the post.

13. The combination with a steering post and a lockable wheel therefor, of a controlling circuit including a pair of contact rings disposed below the wheel, the rings being insulated and spaced apart, a lock comprising a movable bolt for connecting the wheel to the steering post, and a spring pressed contact member and transversely movable for engaging both contact rings to make connection between them when the wheel is locked to the post.

14. The combination with a rotatable steering wheel, of a control circuit including a pair of spaced and insulated contact rings disposed adjacent but separate from the wheel, and means carried by the wheel and movable laterally to make and break connections between the contact rings.

15. The combination with a lockable steering wheel, of a controlling circuit including a double source of current supply, a pair of contact rings, means connecting either one but not both of the sources of supply to one of the rings, and a common device for locking the steering wheel and for making connection between the rings when the wheel is locked.

16. The combination with a steering post and a lockable steering wheel, of a control circuit including a pair of contact rings, a double source of current supply, a snap switch for connecting either one but not both sources at the same time to one of the rings, and means carried by the wheel to connect the wheel to the post and to electrically connect the contact rings.

17. The combination with a steering post and a steering wheel, of an electrical circuit including a pair of fixed circular contact members arranged adjacent the steering wheel and a movable contact member carried by the wheel for engagement therewith, and a single key operated device for controlling the connection of the wheel to the post and for operating the contact member to make the electrical connection between the contact members.

18. The combination with an automobile steering post and a lockable wheel therefor, of an electrical controlling circuit including a pair of relatively fixed ring contact members arranged adjacent the steering wheel and a movable contact maker carried by the wheel, and key controlled locking means for the wheel and for operating the contact member to make and break a connection between the contact members to insure that the wheel is disconnected from the post when the electrical circuit between the contact members is broken.

19. The combination with a lockable steering wheel, of a control circuit including fixed ring contacts and a movable sliding contact maker therefor, and a single key operated means for the wheel and the circuit to move the contact maker transversely out of sliding engagement with one of the rings to insure that the wheel is unlocked as soon as the circuit is open.

WENDELIN P. SENG.